US009279991B2

(12) United States Patent  
Uehara et al.

(10) Patent No.: US 9,279,991 B2  
(45) Date of Patent: Mar. 8, 2016

(54) LIQUID CRYSTAL OPTICAL ELEMENT AND IMAGE DISPLAY DEVICE

(71) Applicant: KABUSHIKI KAISHA TOSHIBA, Minato-ku, Tokyo (JP)

(72) Inventors: Shinichi Uehara, Tokyo (JP); Ayako Takagi, Yokosuka (JP); Masako Kashiwagi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 56 days.

(21) Appl. No.: 14/164,589

(22) Filed: Jan. 27, 2014

(65) Prior Publication Data

US 2014/0139766 A1    May 22, 2014

Related U.S. Application Data

(63) Continuation of application No. PCT/JP2011/067366, filed on Jul. 28, 2011.

(51) Int. Cl.  
*G02F 1/1337* (2006.01)  
*G02F 1/1343* (2006.01)  
(Continued)

(52) U.S. Cl.  
CPC .............. *G02B 27/2214* (2013.01); *G02B 3/14* (2013.01); *G02B 27/26* (2013.01); *G02F 1/134309* (2013.01); *G02F 1/134363* (2013.01); *G02F 1/29* (2013.01); *G02F 2001/134381* (2013.01)

(58) Field of Classification Search  
CPC ............... G02B 27/2214; G02F 1/134363; G02F 2001/133357; G02F 1/133345; G02F 2001/134318; G02F 1/134309; H04N 13/049; G06F 3/0412

USPC ............................ 349/15, 129, 139, 143, 146  
See application file for complete search history.

(56) References Cited

U.S. PATENT DOCUMENTS 7,163,828 B2 *   1/2007   Kijima et al. .................... 438/3  
2008/0007666 A1  1/2008   Takeda et al.  
(Continued)

FOREIGN PATENT DOCUMENTS

JP    2000-102038    4/2000  
JP    2001-501073    1/2001  
(Continued)

OTHER PUBLICATIONS

Notification of the Official Action in Taiwan Pat. Appln. No. 100145042, dated Jul. 22, 2014.  
(Continued)

*Primary Examiner* — Nathanael R Briggs  
(74) *Attorney, Agent, or Firm* — Finnegan, Henderson, Farabow, Garrett & Dunner, LLP (57) ABSTRACT

According to one embodiment, a liquid crystal optical element includes: a pair of first and second substrates; a liquid crystal layer provided between the first and second substrates; first electrodes provided on the first substrate on the liquid crystal layer side and arranged along a first direction; second electrodes provided on the second substrate on the liquid crystal layer side and arranged along a second direction; and a driving unit configured to apply a voltage between the first electrodes and the second electrodes. The first electrodes are divided into electrode regions arranged along a third direction. The first electrodes included in each of the electrode regions are electrically connected to an extension line.

12 Claims, 10 Drawing Sheets

(51) Int. Cl.
*G02B 27/22* (2006.01)
*G02F 1/29* (2006.01)
*G02B 27/26* (2006.01)
*G02B 3/14* (2006.01)

(56) References Cited

U.S. PATENT DOCUMENTS

| | | | |
|---|---|---|---|
| 2010/0259697 A1 | 10/2010 | Sakamoto et al. | |
| 2011/0170026 A1 | 7/2011 | Lin | |
| 2012/0013606 A1* | 1/2012 | Tsai et al. | 345/419 |
| 2012/0105748 A1* | 5/2012 | Huang et al. | 349/15 |

FOREIGN PATENT DOCUMENTS

| | | |
|---|---|---|
| JP | 2005-258013 | 9/2005 |
| JP | 2006-189764 | 7/2006 |
| JP | 2010-224191 | 10/2010 |
| JP | 2010-249954 | 11/2010 |
| JP | 2011-141546 | 7/2011 |
| KR | 10-2006-0124649 | 10/2006 |
| KR | 10-0846707 | 7/2008 |
| TW | 200702774 | 1/2007 |
| TW | 200900827 A | 1/2009 |

OTHER PUBLICATIONS

First Office Action, issued from the Japanese Patent Office, in counterpart Application No. 2013-525528, mailed Aug. 19, 2014, 3 pages.

English-language International Search Report from Japanese Patent Office for International Application No. PCT/JP2011/067366, mailed Aug. 23, 2011.

Final Office Action issued by the Japanese Patent Office on Nov. 18, 2014, for Japanese Patent Application No. 2013-525528, and English-language translation thereof.

Notification of the First Office Action of Chinese Application No. 201180071559.8 dated Jun. 3, 2015, and English translation thereof (13 pages).

* cited by examiner

LIQUID CRYSTAL OPTICAL ELEMENT AND IMAGE DISPLAY DEVICE

CROSS-REFERENCE TO RELATED APPLICATIONS

This application is a Continuation Application of PCT Application No. PCT/JP2011/067366, filed Jul. 28, 2011, the entire contents of which are incorporated herein by reference.

FIELD

Embodiments described herein relate to a liquid crystal optical element and an image display device.

BACKGROUND

Conventionally, display devices capable of displaying stereoscopic (3-dimensional) images are proposed. In the stereoscopic image display devices, optical elements such as lenticular lenses or parallax barriers are used to provide different video image information items in space. The lenticular lens is a lens having semispherical-shaped (semicircular-shaped) cylindrical lenses linearly arranged in a certain direction and has a one-dimensional optical action. In order to provide parallax information for an observer by use of the optical action of the lenticular lens, it is preferable to arrange the array direction of the cylindrical lenses in the horizontal direction (a direction in which the left and right eyes are arranged) for the observer. However, in practice, since moiré occurs with respect to wires or the like if a normal display panel is used, the array direction of the cylindrical lenses may be shifted from the horizontal direction and arranged in an inclined state in some cases. This is true in the case of the parallax barrier.

Further, requests for switching a 2-dimensional (2D) image and a 3-dimensional (3D) image by means of the same display device exist and the technique for satisfying the above request is proposed. For example, in a reference (JP-A 2010-224191(KOKAI)), the technique using a birefringence lens utilizing a liquid crystal or the like and a polarization switching cell is described. 2D display and 3D display are switched by electrically switching the polarization state of light emitted from the polarization switching cell. Further, partial 2D/3D display is realized in which a part of 2D display is converted to 3D display by partially switching the polarization state of the polarization switching cell in the display screen.

Further, in the reference, the array direction of the lenses can be set without particularly paying attention to the influence given to the partial 2D/3D display. The boundary between the 2D display region and the 3D display region in the partial 2D/3D display is determined according to the electrode structure of the polarization switching cell. On the other hand, the array direction of the lenses is determined according to the structure of the birefringence lens. Since there is no correlation between both of the structures, they can be independently and freely designed.

Further, in the reference, the technique for switching 2D display and 3D display by use of a liquid crystal lens array element as the birefringence lens is described. The liquid crystal lens array element has rod-like electrodes repetitively arranged on one of the substrates. Then, an electric field distribution is created between the electrodes and an electrode formed on the other substrate opposed thereto. The alignment of a liquid crystal layer is changed according to the electric field distribution and a refractive index distribution acting as a lens is created. Since the lens action can be turned on/off by controlling voltages applied to the electrodes, 2D display and 3D display can be switched. A system in which the alignment direction of liquid crystal molecules is thus controlled according to the electric field is called a liquid crystal gradient index (GRIN) lens system.

However, since the polarization switching cell is required in addition to the lenses in the partial 2D/3D display switching technique using the birefringence lens and polarization switching cell described in the reference, the structure becomes complicated and a cost increase becomes a problem. Therefore, it is desirable to partially realize 2D/3D display switching without using the polarization switching cell.

Further, according to the study by the inventors, the shape of the boundary between the 2D display region and the 3D display region receives a restriction of the array direction (or extending direction) of the lenses when an attempt is made to partially realize 2D/3D display switching by use of a liquid crystal GRIN lens. Particularly, when the lens is inclined in an oblique direction and arranged as described in a reference (Jpn. PCT National Publication No. 2001-501073), a problem occurs in which the boundary between the 2D display region and the 3D display region becomes oblique with respect to the lens extending direction, thus the lens is not suitable for partial 2D/3D display.

DETAILED DESCRIPTION

In general, according to one embodiment, there is provided a liquid crystal optical element comprising:

a pair of first and second substrates arranged in opposition to each other;

a liquid crystal layer provided between the first and second substrates;

first electrodes provided on the first substrate on the liquid crystal layer side and arranged along a first direction;

second electrodes provided on the second substrate on the liquid crystal layer side and arranged along a second direction different from the first direction; and a driving unit configured to apply a voltage between the first electrodes and the second electrodes, wherein the first electrodes are divided into electrode regions arranged along a third direction different from the first direction, the first electrodes included in each of the electrode regions are electrically connected to an extension line, and the driving unit is configured to apply relatively high and low voltages to the electrode regions, to apply relatively high and low voltages to the second electrodes, and to apply a relatively high voltage between one of the electrode regions and one of the second electrodes.

Embodiments are explained below with reference to the drawings. However, it should be noted that the drawings are schematic or conceptual and the dimensions and ratios in each drawing are not necessarily the same as the actual ones. Further, when the same portion is indicated in the drawings, the relationship of the dimensions and the ratios thereof may be differently indicated in some cases. In the following explanation, constituents having the same functions and configurations are denoted by use of the same symbols and a repetitive explanation is made only when required.

An integral photography method (that is hereinafter referred to as an IP method) for displaying a large number of parallax images or a light reproduction method for recording a stereoscopic image by use of a certain method and reproducing the same as a stereoscopic image is known. When an object is viewed via left and right eyes and if an angle made with respect to the left and right eyes when viewing a point at a short distance is set to α and an angle made with respect to the left and right eyes when viewing a point at a long distance is set to β, α and β differ according to the positional relationship between the object and the observer. The angular difference (α−β) is called binocular parallax and a person can view stereoscopically by use of binocular parallax.

A 3-dimensional image display method in which the IP method is applied to a stereoscopic image display device is called an II (integral imaging) system. In the II system, light emitted from one lens corresponds to the number of element images. Normally, this is called a parallax number and parallax light beams are emitted in parallel in the respective lenses. In the II system, a person views different images such as a 1-parallax image, 2-parallax image and 3-parallax image according to the position of the observer or the viewing angle of the observer. Therefore, the observer perceives a stereo-image based on the parallaxes input to the right eye and left eye.

A liquid crystal optical element explained in the following embodiments can be applied to a glassless stereoscopic image display device using the II system and, for example, can be used to display a plurality of parallax images. Of course, this can also be used in a stereoscopic image display device other than the II system or an image display device that displays different images in different angular directions.

First Embodiment

Figure 1:
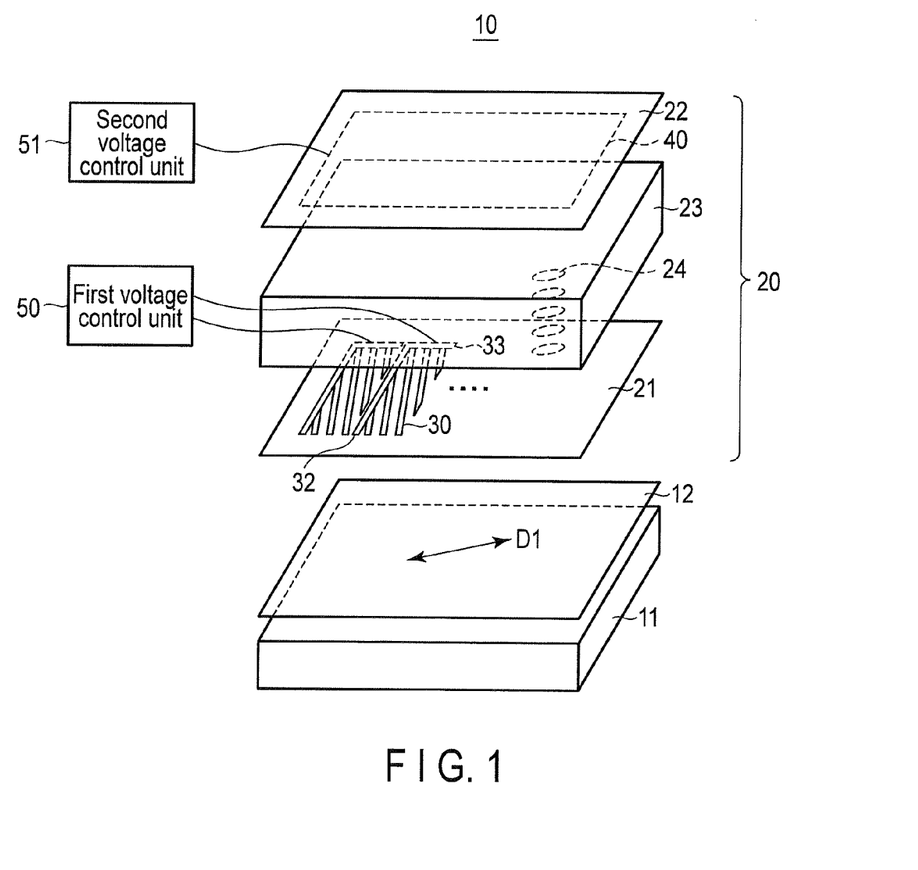
FIG. 1 is a schematic view of an image display device according to a first embodiment.

FIG. 1 is a schematic view of an image display device 10 according to a first embodiment. The image display device 10 includes an image display unit 11 capable of displaying a two-dimensional image, polarizing plate 12, a liquid crystal GRIN lens 20 as a gradient index type optical element, first voltage control unit 50 and second voltage control unit 51.

The image display unit 1 is preferably a so-called flat panel display (FPD) having pixels arranged in a matrix form and a non-emission type liquid crystal display (LCD), emission type plasma display (PDP: Plasma Display Panel), emission type organic EL (electroluminescence) display or the like is used as the image display unit. The non-emission type display includes a backlight and displays an image by use of light from the backlight.

An arrow (first direction D1) described on the polarizing plate 12 of FIG. 1 indicates a polarizing direction. The polarizing plate 12 polarizes light from the image display unit 11 and emits linearly polarized light of first direction D1. In FIG. 1, the polarizing plate 12 is extracted from the image display unit 11 and shown to explain the polarizing direction, but generally, the image display unit 11 and polarizing plate 12 are combined to configure an image display unit. The liquid crystal GRIN lens 20 is arranged on the side on which an image is emitted from the image display unit 11.

Figure 2:
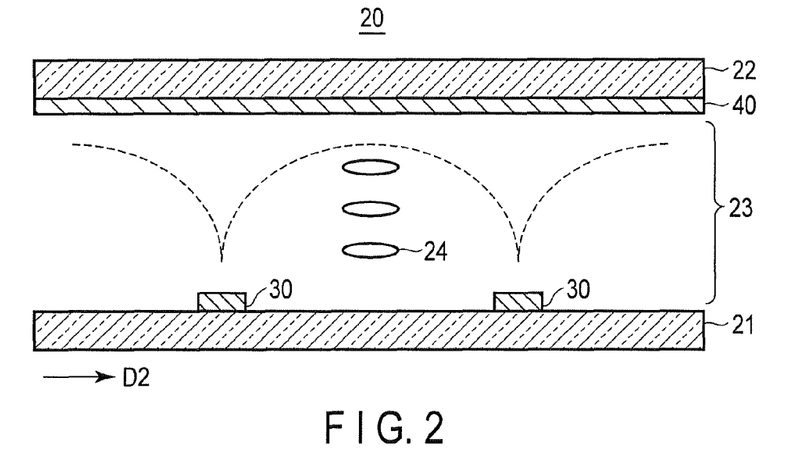
FIG. 2 is a cross-sectional view of a liquid crystal GRIN lens.

FIG. 2 is a cross-sectional view of the liquid crystal GRIN lens 20. The liquid crystal GRIN lens 20 is a lens that creates a refractive index distribution by use of two electrodes arranged on both sides of the liquid crystal layer. The liquid crystal GRIN lens 20 includes a pair of transparent substrates (for example, glass substrates) 21 and 22, a liquid crystal layer 23 sandwiched between the transparent substrates 21 and 22, a plurality of first electrodes 30 and a second electrode 40.

The plural first electrodes 30 are provided on the transparent substrate 21 on the side of the liquid crystal layer 23. In the cross section of FIG. 2, only two of the first electrodes 30 are extracted and shown. The concrete configuration of the first electrode 30 is described later. The second electrode 40 is provided in a plane form on the transparent substrate 22 on the side of the liquid crystal layer 23. The area of the second electrode 40 is set approximately equal to the area containing the plurality of first electrodes 30, for example. The first electrodes 30 and second electrode 40 are formed of transparent electrodes.

The liquid crystal layer 23 contains a plurality of liquid crystal molecules 24. In the present embodiment, as the liquid crystal molecules 24, substances exhibiting uniaxial birefringence are used. The initial alignment of the liquid crystal molecules 24 in a state in which no electric field is applied to the liquid crystal layer 23 is set to set the major axis direction thereof to first direction D1. The initial alignment is controlled by use of an alignment film (not shown) subjected to a rubbing process, for example.

Figure 3:
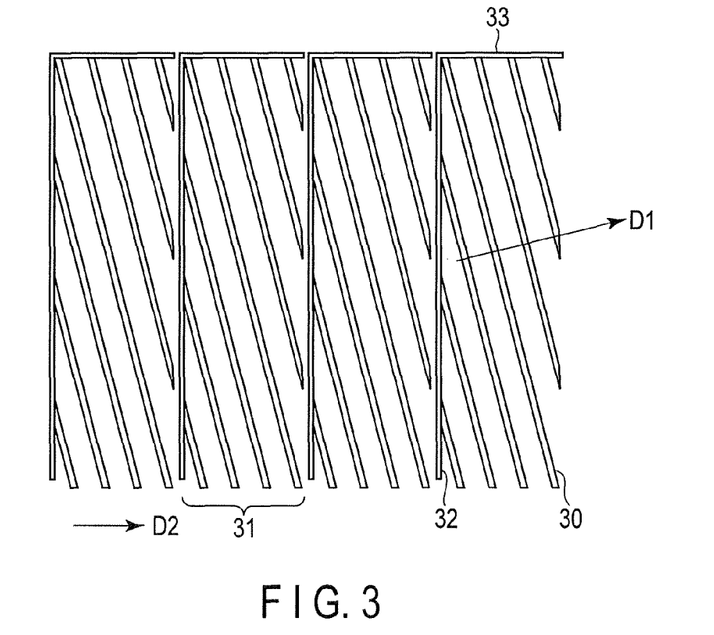
FIG. 3 is a plan view of a plurality of first electrodes.

FIG. 3 is a plan view of the plural first electrodes 30. The plural first electrodes 30 are arranged at equal intervals along first direction D1. The width of each first electrode 30 is set smaller than half the array pitch of the first electrodes 30. The array pitch of the first electrodes 30 is the length obtained by adding the width of the first electrode 30 and the distance between the first electrodes 30 in first direction D1. The plural first electrodes 30 are divided into a plurality of first electrode regions 31 arranged along second direction D2 different from the first direction. For example, when the image display device 10 is placed in a vertical position, second direction D2 corresponds to the horizontal direction of the screen and when the image display device 10 is placed in a horizontal position, second direction D2 corresponds to the lateral direction of the screen.

A preset number of first electrodes 30 contained in each first electrode region 31 are electrically connected via extension lines 32 and 33. The extension lines 32 and 33 are formed of the same material as the first electrode 30. The extension line 32 extends in a direction perpendicular to second direction D2 and is arranged at the end portion of the first electrode region 31 in second direction D2. The extension line 33 is electrically connected to the extension line 32, is arranged at the upper end of the first electrode region 31 and extends in second direction D2. The extension line 33 electrically connects the first electrodes 30 that are not electrically connected via the extension line 32 in the first electrode region 31. The plural first electrodes 30 with the above configuration can perform voltage control with the first electrode region 31 used as a unit.

One columnar lens of the liquid crystal GRIN lens 20 is formed of adjacent two first electrodes 30. The distance between the adjacent two first electrodes 30 (specifically, the distance between the centers of the respective adjacent two first electrodes 30) is used as a lens pitch. Therefore, the liquid crystal GRIN lens 20 forms a lens array in which a plurality of oblique lenses inclined with respect to a direction perpendicular to second direction D2 are arranged in first direction D1. The inclination of the liquid crystal GRIN lens 20, that is, angle θ made between second direction D2 and first direction D1 satisfies the condition of "$\theta \neq 0, -45° < \theta < 45°$"

(Operation)

Next, the operation of the liquid crystal GRIN lens 20 is explained. The voltage control for the liquid crystal GRIN lens 20 is performed by use of the first voltage control unit 50 and second voltage control unit 51 shown in FIG. 1. The first voltage control unit (first driving unit) 50 is electrically connected to the plurality of extension lines 32 (or extension lines 33), respectively, and is configured to independently perform the voltage control for the plurality of extension lines 32, respectively. The second voltage control unit (second driving unit) 51 is electrically connected to the second electrode 40 and performs the voltage control for the second electrode 40.

First, the operation of the liquid crystal GRIN lens 20 when performing 3D display is explained. The second voltage control unit 51 applies a reference voltage (for example, ground voltage) to the second electrode 40. The first voltage control unit 50 applies preset voltage V1 higher than the reference voltage to the extension line 32 of the first electrode region 31 corresponding to a region in which the 3D display is performed. Voltage V1 is set higher than or equal to threshold voltage Vth. Vth is a threshold voltage set for exhibiting the lens effect and the liquid crystal molecules 24 whose major axes are set in a horizontal direction rise in a vertical direction by giving a potential difference of threshold voltage Vth or more to the liquid crystal layer 23. Threshold voltage Vth can be experimentally derived by fixing the second electrode 40 at the ground voltage and gradually increasing the voltage of the first electrode 30.

As described above, the plurality of extension lines 32 are respectively provided in the plurality of first electrode regions 31 and each extension line 32 is electrically connected to a preset number of first electrodes 30 contained in the first electrode region 31 corresponding thereto. Therefore, when voltage V1 is applied to a certain extension line 32, the same voltage V1 will be applied to a preset number of first electrodes 30 contained in the corresponding first electrode region 31.

Figure 4:
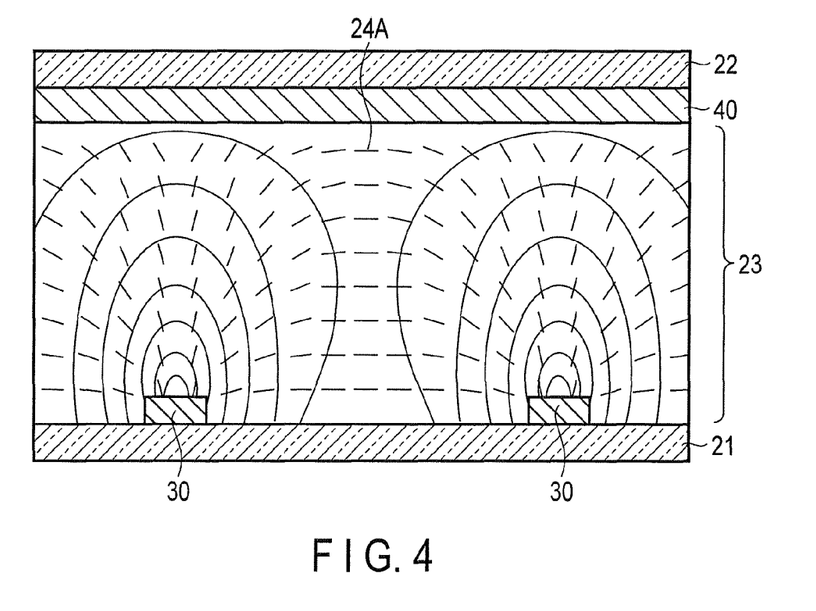
FIG. 4 is a view showing liquid crystal director distribution when an electric field is applied to a liquid crystal layer.

FIG. 4 is a view showing the liquid crystal director distribution when an electric field is applied to the liquid crystal layer 23. A symbol 24A shown in FIG. 4 is a director indicating a major axis direction (longitudinal direction) of the liquid crystal molecule 24. In a neighboring portion (lens end portion) of the first electrode 30 to which voltage V1 is applied, the liquid crystal molecules 24 rise due to the influence of the applied voltage. In the liquid crystal region in which the liquid crystal molecules 24 have risen, since the ratio of light emitted from the image display unit 11 and intersecting with the liquid crystal director at right angles is low, the influence of birefringence is hardly given thereto. Therefore, the refractive index of the lens end portion decreases and, as a result, the light path length becomes short.

On the other hand, since the ratio of light intersecting with the liquid crystal director at right angles in light emitted from the image display unit 11 becomes higher in a portion farther apart from the first electrode 30, that is, in a portion nearer to the lens center, the influence of birefringence is greatly given thereto. Therefore, the refractive index gradually increases in a portion nearer to the lens center. Thus, the electric field distribution is gradually changed between the adjacent two first electrodes 30, and therefore, the refractive index distribution and the light path length are also gradually changed. As a result, as indicated by broken lines of FIG. 2, the refractive index distribution as a lens is realized. Thus, in the first electrode region 31 to which voltage V1 is applied, the lens effect is exhibited.

Then, since the light beam direction of the image of the image display unit 11 is controlled by means of a plurality of lenses contained in the liquid crystal GRIN lens 20, the image display device 10 can display a plurality of parallax images. As a result, the observer can visually confirm a stereoscopic image. Thus, 3D display can be partially realized.

Next, the operation of the liquid crystal GRIN lens 20 when performing 2D display is explained. The second voltage control unit 51 applies a reference voltage (for example, ground voltage) to the second electrode 40. The first voltage control unit 50 applies the same voltage as the second electrode 40, that is, the ground voltage to the extension line 32 of the first electrode region 31 corresponding to a region in which the 2D display is performed. In this case, since no electric field is applied to the liquid crystal layer 23 and the liquid crystal molecules 24 maintain the initial alignment, the refractive index distribution as a lens is not realized. As a result, in the first electrode region 31 to which the ground voltage is applied, the lens effect is not exhibited and the 2D display is partly realized. In the case of performing the 2D display, the voltage applied to the first electrode 30 is not limited to the ground voltage and may be any voltage as long as it is less than threshold voltage Vth.

(Effect)

As described above in detail, in the first embodiment, the liquid crystal GRIN lens 20 includes the pair of transparent substrates 21 and 22 arranged in opposition to each other, the liquid crystal layer 23 provided between the transparent substrates 21 and 22, the plural first electrodes 31 provided on the transparent substrate 21 on the side of the liquid crystal layer 23 and arranged in first direction D1 and the second electrode 40 provided on the transparent substrate 22 on the side of the liquid crystal layer 23. Then, the plural first electrodes 30 are divided into the plural first electrode regions 31 arranged along second direction D2 different from first direction D1. Further, the preset number of first electrodes 30 contained in each first electrode region 31 are electrically connected via the extension line 32.

Therefore, the first embodiment has the following effect.

The boundary of the first electrode regions 31 (that is, the line of the extension line 32) is independently set with respect to the boundary of the lens (that is, the line of the first electrode 30). Then, in the present embodiment, on/off of the lens function can be switched with the first electrode region 31 used as a unit. As a result, in the liquid crystal GRIN lens 20 configuring the oblique lens array inclined with respect to a direction perpendicular to second direction D2, the 2D display and 3D display can be partly switched with the rectangular region used as a unit without being restricted by the lens boundary.

Further, in this embodiment, the 2D display and 3D display can be partly switched simply by providing the liquid crystal GRIN lens 20 on the side on which light of the image display unit 11 is emitted. That is, since a polarization switching cell is unnecessary, a cost reduction and a reduction in the thickness of the image display device 10 capable of switching the 2D/3D display can be realized.

Further, since the extension line 32 is provided at the end portion of the first electrode region 31 in second direction D2, a lowering in the image quality caused by arrangement of the extension line 32 can be suppressed. In the boundary of the first electrode regions 31, a slight disturbance may occur in the electric field distribution in some cases due to the influence caused by dividing the first electrodes 30. Further, a slight disturbance may also occur in the electric field distribution in some cases in a neighboring portion of the extension line 32. A region influenced by the disturbance of the electric field distribution can be made small by reducing the distance between the first electrode regions 31, that is, the distance between the extension line 32 and a portion of division of the first electrodes 30. As a result, a lowering in the image quality of the image display device 10 can be suppressed.

In the present embodiment, the main concept of the liquid crystal GRIN lens 20 is explained by use of the least configuration in which the first electrodes 30 are arranged on the lens boundaries, but this embodiment is not limited to this case. The refractive index distribution can be created as a lens by using a further increased number of electrodes.

Further, a case wherein the initial alignment of the liquid crystal layer in the present embodiment is horizontal alignment in the horizontal direction is explained, but the liquid crystal alignment is not limited to this case. Another liquid crystal mode can also be applied.

Further, in this embodiment, a case wherein the gradient index type liquid crystal optical element is operated as the liquid crystal lens array element is explained, but this embodiment is not limited to this case. The liquid crystal optical element is satisfactory if it has a performance for realizing the 3D display and, for example, it is sufficient if the refractive index distribution as a perfect lens is not realized and it is sufficient if it functions as a prism array element.

Further, in the present embodiment, the gradient index type liquid crystal optical element is explained, but the material used is not limited to liquid crystal. A material having the same electro-optical effect can also be applied.

Second Embodiment

Figure 5:
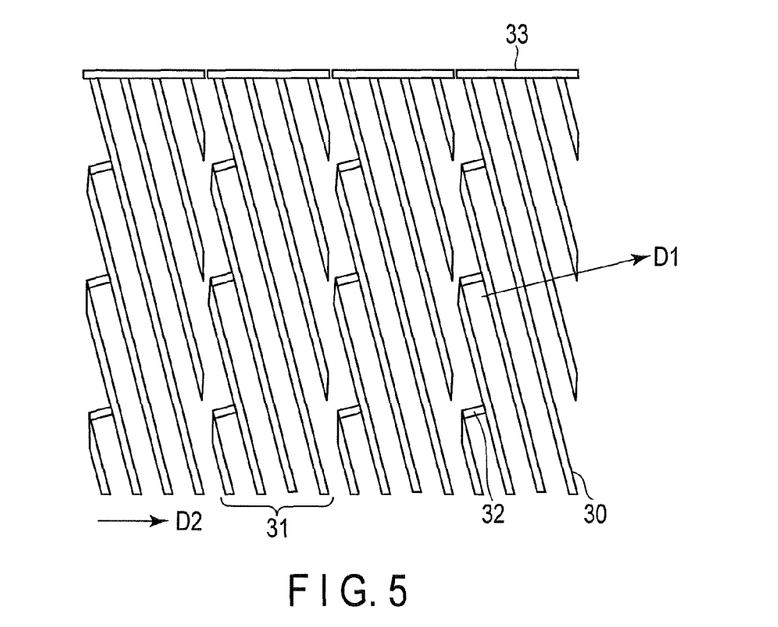
FIG. 5 is a plan view of a plurality of first electrodes according to a second embodiment.

A second embodiment shows another configuration example of extension lines 32 that electrically connect a plurality of first electrodes 30. In a liquid crystal GRIN lens 20 that is a liquid crystal optical element of this embodiment, the arrangement of the extension lines 32 is different in comparison with the first embodiment. FIG. 5 is a plan view of the plural first electrodes 30 according to the second embodiment.

As shown in FIG. 5, the extension line 32 is arranged to have the shortest length between adjacent two first electrodes 30 in each first electrode region 31 and the extension line 32 electrically connects the adjacent two first electrodes 30. In other words, the extension line 32 extends in first direction D1 that is an array direction of the first electrodes 30 between the adjacent two first electrodes 30. Like the first embodiment, a plurality of extension lines 32 contained in each first electrode region 31 are arranged at the end portion of the first electrode region 31 in second direction D2. As a result, a preset number of first electrodes 30 contained in each first electrode region 31 are electrically connected via the plural extension lines 32 and extension line 33.

Further, in the present embodiment, since the rubbing direction is set to first direction D1, the rubbing direction coincides with the extending direction of the extension line 32. Other configurations and operations in this embodiment are the same as in the first embodiment.

As described above in detail, according to this embodiment, the length of the extension line 32 can be reduced in comparison with the first embodiment. As a result, the liquid crystal alignment distribution as the liquid crystal GRIN lens 20 can be suppressed from being disturbed by an electric field from the extension lines 32 at the voltage application time. Thus, the image quality of an image display device 10 can be suppressed from being lowered. Particularly, in this embodiment, since the extension line 32 is arranged to have the shortest length, the effect that the image quality is suppressed from being lowered can be further enhanced.

Further, since the extending direction of the extension line 32 is set to coincide with the rubbing direction, liquid crystal molecules 24 can be suppressed from being twisted and deformed due to an electric filed from the extension lines 32. As a result, the image quality of the image display device 10 can be enhanced.

In this embodiment, a case wherein the extension line 32 is arranged to have the shortest length between the first electrodes 30 is explained, but it is not limitative. Even when the length of the extension line 32 is not the shortest, that is, even when the extending direction of the extension line 32 is inclined with respect to first direction D1, the image quality improvement effect can be attained.

The other effects in this embodiment are the same as in the first embodiment.

Third Embodiment

Figure 6:
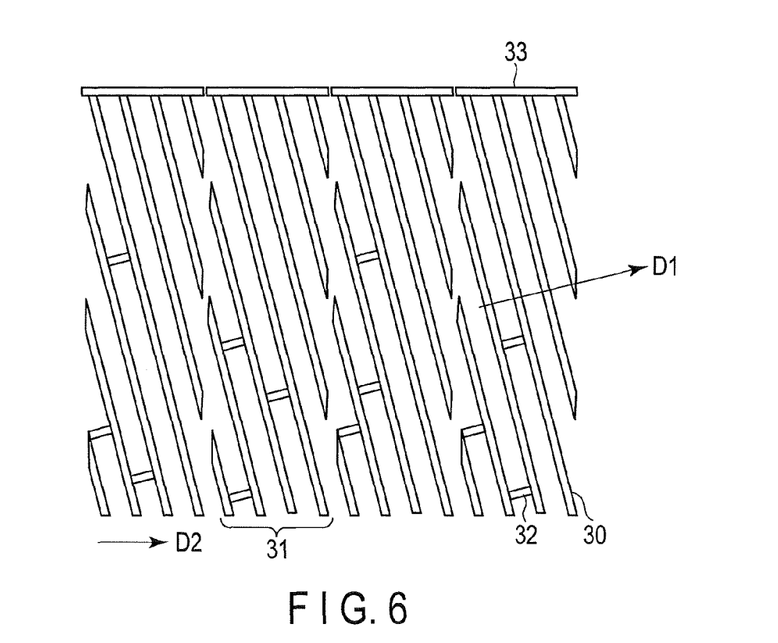
FIG. 6 is a plan view of a plurality of first electrodes according to a third embodiment.

A third embodiment shows still another configuration example of extension lines 32 that electrically connect a plurality of first electrodes 30. In a liquid crystal GRIN lens 20 that is a liquid crystal optical element of this embodiment, the arrangement of the extension lines 32 is different in comparison with the second embodiment. FIG. 6 is a plan view of the plural first electrodes 30 according to the third embodiment.

As described above, in the second embodiment, the plural extension lines 32 are arranged in a line in a direction perpendicular to second direction D2 in each first electrode region 31. On the other hand, in this embodiment, as shown in FIG. 6, the plural extension lines 32 are arranged in a zigzag form in each first electrode region 31. As a result, the plural extension lines 32 are not concentratedly arranged in a specified portion and are dispersedly arranged. Other configurations and operations in this embodiment are the same as in the first embodiment.

As described above in detail, according to this embodiment, portions in which the liquid crystal alignment distribution is disturbed due to the extension lines 32 can be dispersed. As a result, in this embodiment, disturbance of the liquid crystal alignment can be made hardly noticeable in comparison with a case wherein they are linearly arranged at regular intervals as in the second embodiment. As a result, the image quality of an image display device 10 can be enhanced.

Other effects of this embodiment are the same as in the second embodiment.

Fourth Embodiment

Figure 7:
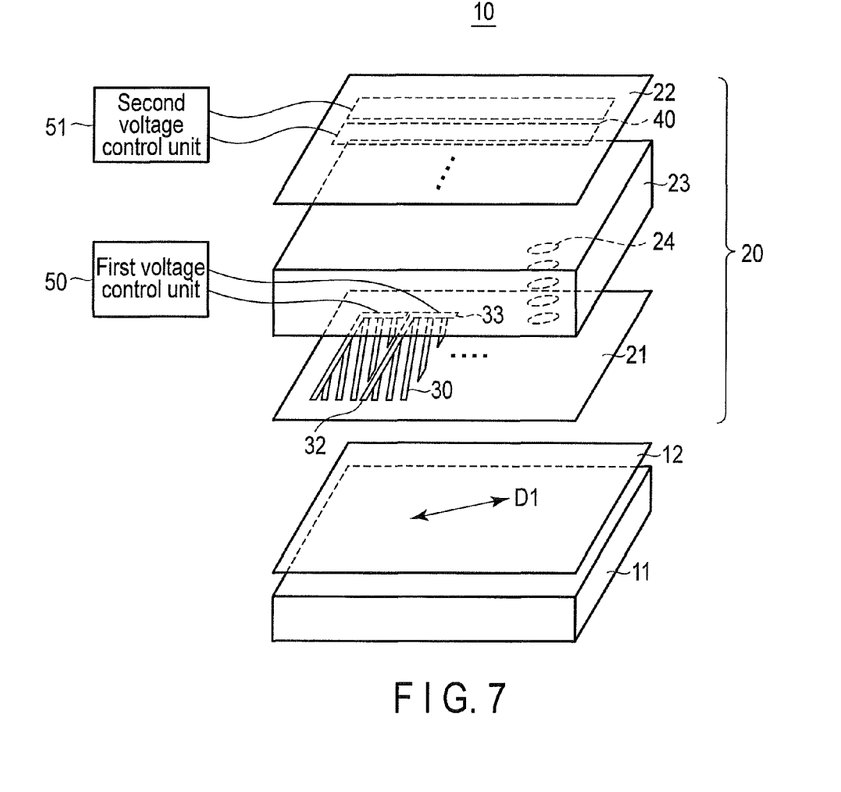
FIG. 7 is a schematic view of an image display device according to a fourth embodiment.
Figure 8:
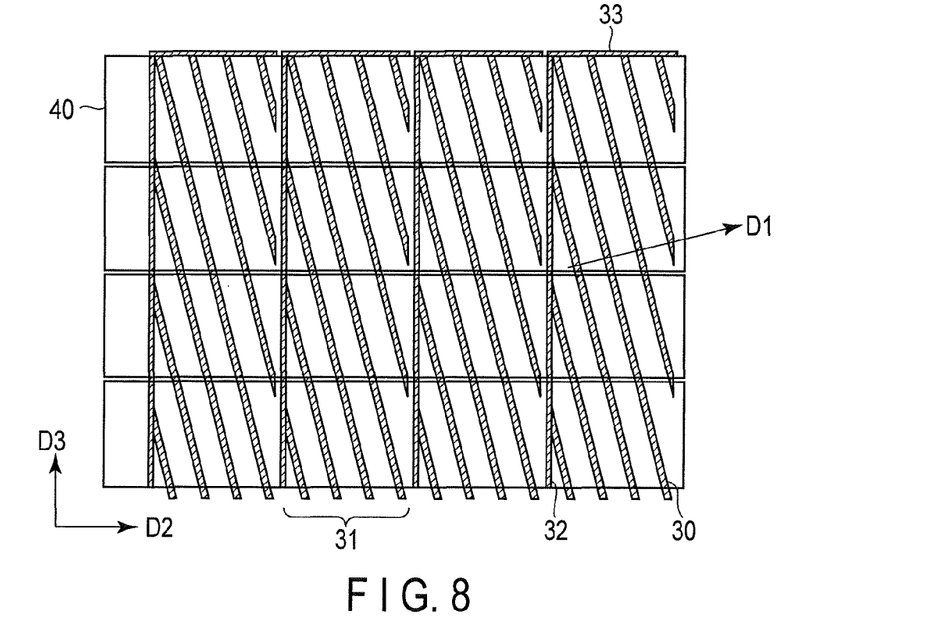
FIG. 8 is a plan view of first and second electrodes configuring a liquid crystal GRIN lens.

In a fourth embodiment, a second electrode 40 provided on a transparent substrate 22 is divided into plural portions and the unit of a region in which the 2D/3D display is switched can be controlled to be made small in comparison with the first embodiment. FIG. 7 is a schematic view of an image display device 10 according to the fourth embodiment. FIG. 8 is a plan view of first electrodes 30 and second electrodes 40 configuring a liquid crystal GRIN lens 20.

The liquid crystal GRIN lens 20 of this embodiment is different from the first embodiment in the shape of the second electrode 40. In the first embodiment, the second electrode 40 is formed in a plane form on the second substrate 22. On the other hand, in this embodiment, the second electrode 40 is divided into plural portions and the thus divided plural second electrodes 40 are arranged along third direction D3 perpendicular to second direction D2. Other configurations in this embodiment are the same as in the first embodiment.

In this embodiment, switching of the 2D/3D display can be partly realized not only in second direction D2 but also in third direction D3 by selecting voltages respectively applied to the first electrodes 30 and second electrodes 40.

Next, the operation of the liquid crystal GRIN lens 20 is explained. A second voltage control unit 51 is configured to be electrically connected to the plural second electrodes 40 and independently voltage-control the plural second electrodes 40, respectively. The configuration of a first voltage control unit 50 is the same as in the first embodiment. In the configuration example of FIG. 8, since the liquid crystal GRIN lens 20 includes four first electrode regions 31 and four second electrodes 40, different control operations can be performed in 16 (4×4) divided display regions.

It is supposed that the application voltages of the first electrodes 30 are set to V1on and V1off and the application voltages of the second electrodes 40 are set to V2on and V2off. V1on is applied to the first electrode 30 corresponding to a display region in which the lens effect of the liquid crystal GRIN lens 20 is exhibited and V2on is applied to the second electrode 40 corresponding to the display region in which the lens effect of the liquid crystal GRIN lens 20 is exhibited. V1off is applied to the first electrode 30 corresponding to a display region in which the lens effect is not exhibited and V2off is applied to the second electrode 40 corresponding to the display region in which the lens effect is not exhibited. Vth is the threshold voltage for exhibiting the lens effect. The application voltages are selected to establish the following expressions.

Figure 9:
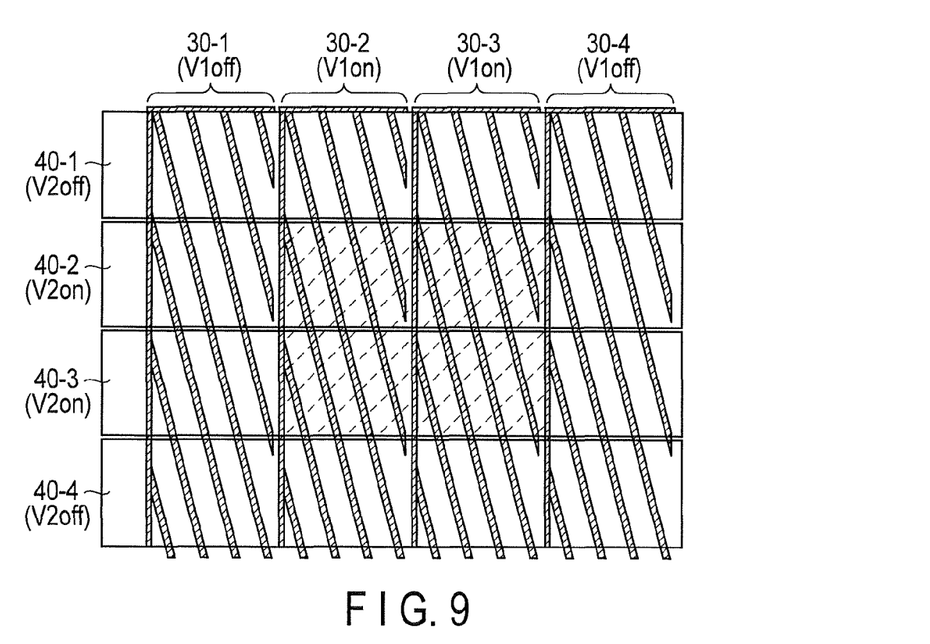
FIG. 9 is a view showing one example of the voltage relationship for partially performing 3D display.

$|V1on-V2on| \geq Vth$ $|V1on-V2off| < Vth$ $|V1off-V2on| < Vth$ $|V1off-V2off| < Vth$ FIG. 9 is a view showing one example of the voltage relationship for partially performing 3D display. As one example, a case wherein 3D display is performed in a region indicated by broken lines in FIG. 9, that is, only in four divided regions at the center is explained. In the case of this example, the first voltage control unit 50 respectively applies voltage V1on to first electrodes 30-2 and 30-3 and respectively applies voltage V1off to the other first electrodes 30-1 and 30-4. Further, the second voltage control unit 51 respectively applies voltage V2on to second electrodes 40-2 and 40-3 and respectively applies voltage V2off to the other second electrodes 40-1 and 40-4. By the above voltage control, a potential difference higher than or equal to threshold voltage Vth is given only to a region indicated by broken lines in FIG. 9 and the lens effect is exhibited in this region. As a result, the region indicated by broken lines in FIG. 9 is 3D-displayed.

On the other hand, since a potential difference higher than or equal to threshold voltage Vth is not given in a region other than the region indicated by broken lines in FIG. 9, the lens effect is not exhibited in this region. As a result, the region other than the region indicated by broken lines in FIG. 9 is 2D-displayed.

Thus, according to this embodiment, the lens becomes effective in a region in which V1on is applied to the first electrode 30 and V2on is applied to the second electrode 40 and the lens effect is not exhibited in the other region. As a result, switching of the 2D display and 3D display can be partly realized in both of the vertical and horizontal directions of the screen.

Other effects in this embodiment are the same as in the first embodiment. Further, it is of course possible to apply the second and third embodiments to the fourth embodiment.

Fifth Embodiment

A fifth embodiment configures an image display device 10 capable of switching 2D/3D display by use of a liquid crystal parallax barrier as parallax generation means instead of the liquid crystal lens array. The liquid crystal parallax barrier includes a slit array arranged in one direction. Since light from an image display unit 11 is observed over slits (opening portions) of the liquid crystal parallax barrier, a direction in which the pixels of the image display unit 11 can be observed is limited to an extremely narrow range. The image display device 10 can display a plurality of parallax images by adequately setting the pitch of the slits and the distance between the slit and the image display unit 11. As a result, the observer can visually confirm a stereoscopic image.

Figure 10:
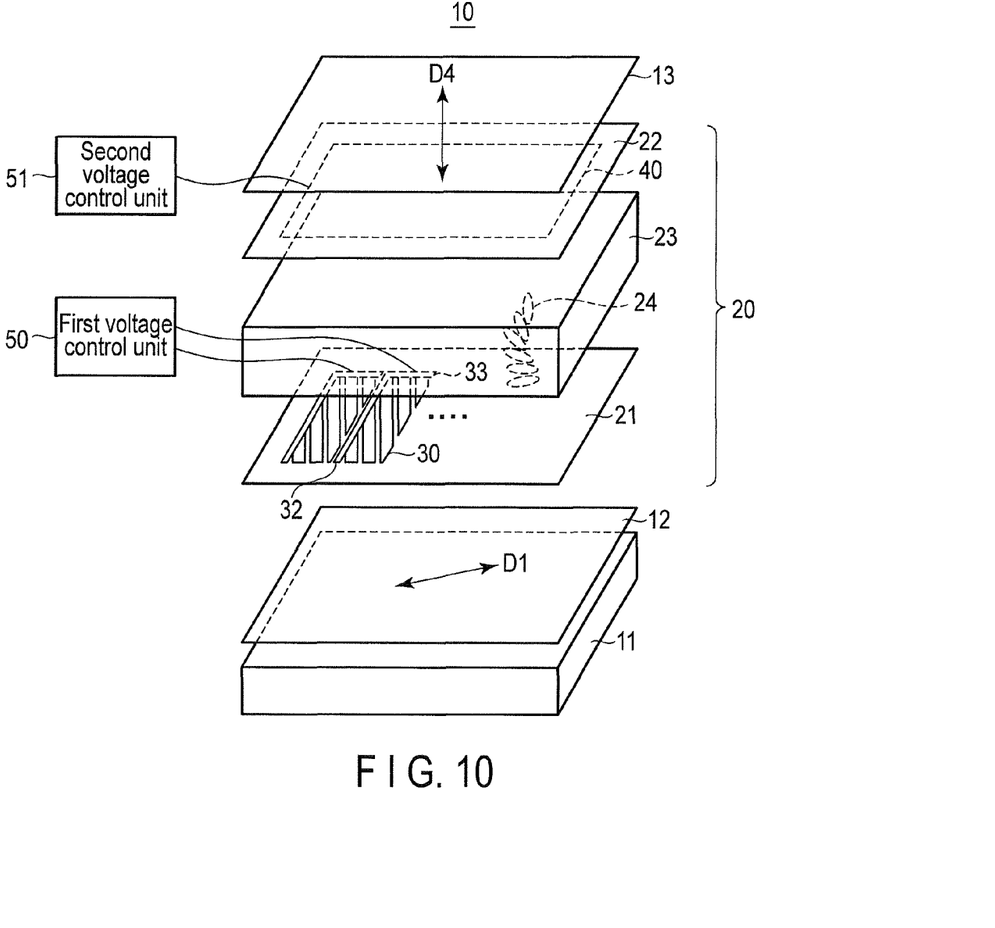
FIG. 10 is a schematic view of an image display device according to a fifth embodiment.

FIG. 10 is a schematic view of the image display device 10 according to the fifth embodiment. The image display device 10 includes the image display unit 11, polarizing plate 12, a liquid crystal parallax barrier 20 as a liquid crystal optical element and polarizing plate 13.

An arrow described on the polarizing plate 13 of FIG. 10 indicates a polarizing direction. The polarizing plate 13 emits linearly polarized light in fourth direction D4 (a direction perpendicular to second direction D2). That is, the polarizing direction (transmission axis) of the polarizing plate 13 makes an angle of 90° with respect to the polarizing direction (transmission axis) of the polarizing plate 12.

Figure 11:
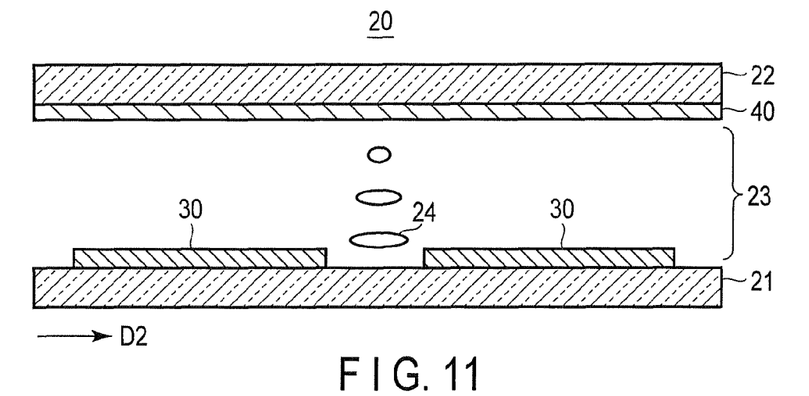
FIG. 11 is a cross-sectional view of a liquid crystal parallax barrier.

FIG. 11 is a cross-sectional view of the liquid crystal parallax barrier 20. A liquid crystal layer 23 is a so-called TN (Twisted Nematic) liquid crystal layer in which liquid crystal molecules 24 contained therein are arranged horizontally with respect to a transparent substrate 21 and twisted by 90° between the transparent substrate 21 and a transparent substrate 22. As a result, in a state in which no electric field is applied, the polarizing direction (polarization surface) of light linearly polarized by the polarizing plate 12 is rotated by 90° in the TN liquid crystal layer 23 along the liquid crystal molecules 24 and the light is transmitted through the polarizing plate 13 having the polarizing direction of 90° with respect to the polarizing plate 12 and displays a white state. That is, the liquid crystal parallax barrier 20 is a TN mode and a normally white system (white display is provided in a state in which no electric field is applied). The initial alignment of the TN liquid crystal layer 23 is realized by sandwiching the liquid crystal molecules 24 between two alignment films (not shown) rubbing-processed in directions perpendicular to each other. The thickness of the liquid crystal layer 23 is set to an optimum value at which the TN mode can be realized according to a liquid crystal material.

Figure 12:
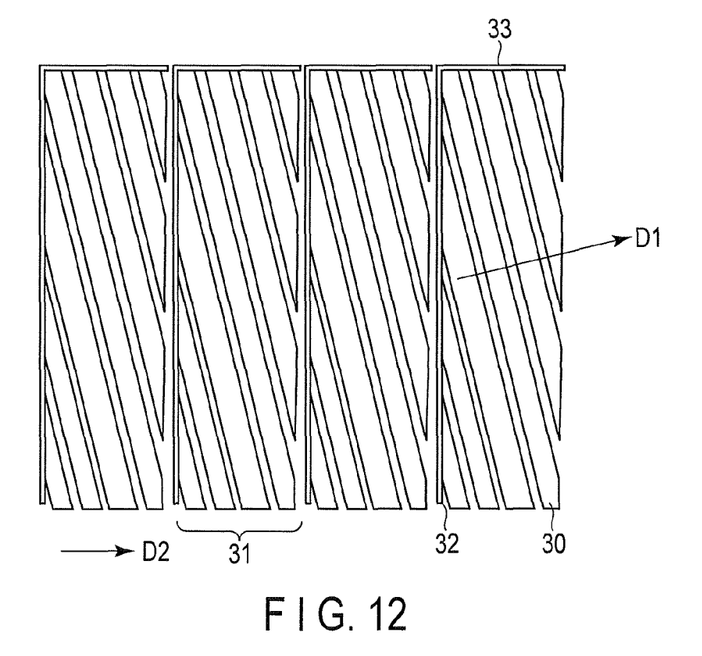
FIG. 12 is a plan view of a plurality of first electrodes.

FIG. 12 is a plan view of a plurality of first electrodes 30. The plural first electrodes 30 are arranged at equal intervals along first direction D1. The width of each first electrode 30 is set to be larger than half the array pitch of the first electrodes 30. As a result, the opening portion between the first electrodes 30 functioning as the slit of the parallax barrier becomes less than half the array pitch of the first electrodes 30. The plural first electrodes 30 are divided into a plurality of first electrode regions 31 arranged along second direction D2. The configuration of extension lines 32 and 33 is the same as in the first embodiment.

Next, the operation of the liquid crystal parallax barrier 20 is explained. First, the operation of the liquid crystal parallax barrier 20 when the 3D display is performed is explained.

A second voltage control unit 51 applies reference voltage (for example, ground voltage) to a second electrode 40. A first voltage control unit 50 applies preset voltage V1 higher than the reference voltage to the extension line 32 of the first electrode region 31 corresponding to a region in which the 3D display is performed. Voltage V1 is set higher than or equal to threshold voltage Vth. As a result, an electric field is applied to the liquid crystal region sandwiched between the first electrode 30 and the second electrode 40 and the liquid crystal molecules 24 rise. In a region in which the liquid crystal molecules 24 have risen, the polarizing direction of light emitted from the polarizing plate 12 is not rotated by 90° and the light is shielded by means of the polarizing plate 13 and displays a black state. That is, the liquid crystal region sandwiched between the first electrode 30 and the second electrode 40 functions as a barrier that shields light.

On the other hand, in a liquid crystal region that is not sandwiched between the first electrode 30 and the second electrode 40, that is, in a region (slits) in which the first electrodes 30 are not formed, no electric field is applied to the liquid crystal molecules 24 and the liquid crystal molecules 24 maintain the initial alignment. Therefore, in the slits, the polarizing direction of light emitted from the polarizing plate 12 is rotated by 90° and the light is transmitted through the polarizing plate 13. As a result, the 3D display can be partially realized by means of the slits.

Next, the operation of the liquid crystal parallax barrier 20 when 2D display is performed is explained. The second voltage control unit 51 applies a reference voltage (for example, ground voltage) to the second electrode 40. The first voltage control unit 50 applies the same voltage as the second electrode 40, that is, the ground voltage to the extension line 32 of the first electrode region 31 corresponding to a region in which the 2D display is performed. In this case, since no electric field is applied to the liquid crystal layer 23, the liquid crystal molecules 24 maintain the initial alignment. Therefore, in the first electrode region 31 to which the ground voltage is applied, the polarizing direction of light emitted from the polarizing plate 12 is rotated by 90° and the light is transmitted through the polarizing plate 13. As a result, in the liquid crystal region to which no electric field is applied, no slit is formed and the 2D display will be realized. When the 2D display is performed, the voltage applied to the first electrodes 30 is not limited to the ground voltage and may be sufficient if it is less than threshold voltage Vth.

As described above in detail, according to this embodiment, the boundary of the first electrode regions 31 (that is, the line of the extension line 32) is set independently from the boundary of the slits (that is, the line of the first electrode 30). Then, in this embodiment, on/off of the slit function can be switched with the first electrode region 31 used as a unit. As a result, in the liquid crystal parallax barrier 20 having slits inclined with respect to a direction perpendicular to second direction D2, the 2D display and 3D display can be partly switched with the rectangular region used as a unit without being restricted by the boundary of the slits.

Further, the shielding effect of the parallax barrier can be effectively exhibited by setting the width of the first electrode 30 larger than half the array pitch of the first electrodes 30. Other effects in this embodiment are the same as in the first embodiment.

Sixth Embodiment

In the fourth embodiment described before, the electrodes formed on the side of the transparent substrate 21 are only the first electrodes 30. However, if the liquid crystal GRIN lens is formed in practice, it is sometimes preferable to add electrodes to enhance the lens performance according to the condition, such as the focal distance of a lens to be realized. Therefore, in a sixth embodiment, an attempt is made to further enhance the lens performance by arranging first electrodes 30 at the lens end portions and arranging, at the lens central portion, a third electrode 60 that can be voltage-controlled to be different from the first electrodes 30.

Figure 13:
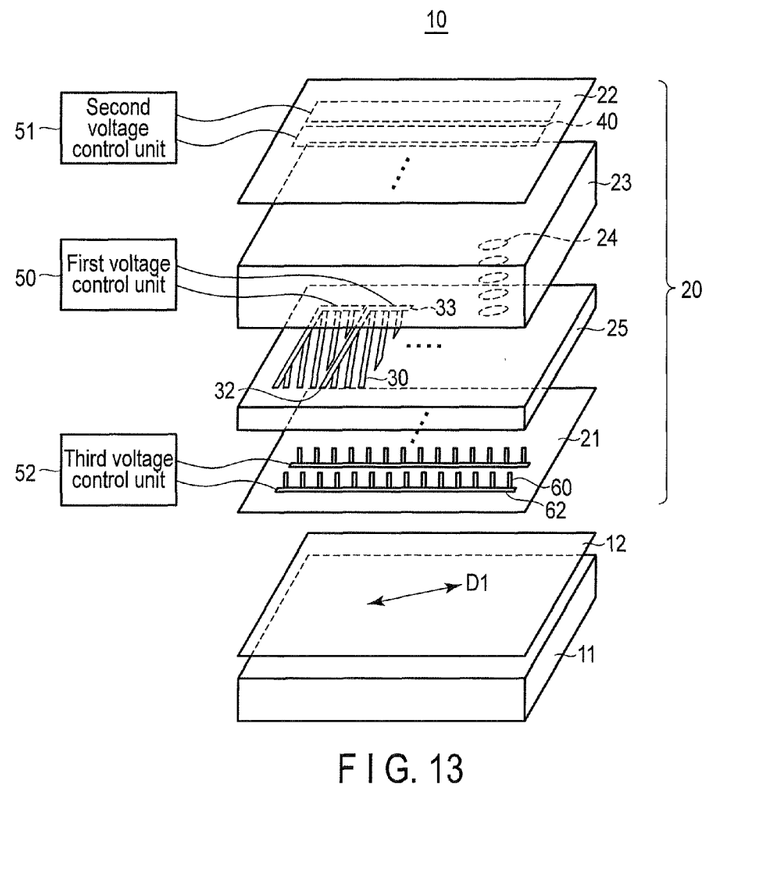
FIG. 13 is a schematic view of an image display device according to a sixth embodiment.
Figure 14:
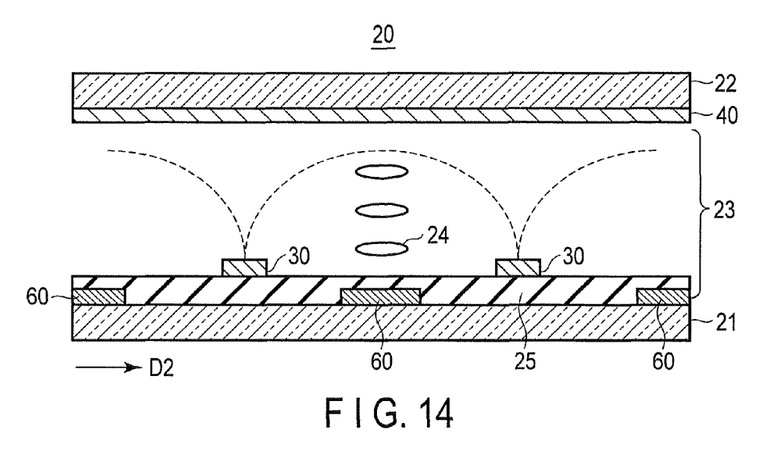
FIG. 14 is a cross-sectional view of a liquid crystal GRIN lens.

FIG. 13 is a schematic view of an image display device 10 according to the sixth embodiment. FIG. 14 is a cross-sectional view of a liquid crystal GRIN lens 20. The liquid crystal GRIN lens 20 includes a pair of transparent substrates 21 and 22, a dielectric layer 25 provided between the transparent substrates 21 and 22, a liquid crystal layer 23 sandwiched between the transparent substrate 21 and the dielectric layer 25, a plurality of first electrodes 30, a plurality of second electrodes 40, a plurality of third electrodes 60, first voltage control unit 50, second voltage control unit 51 and third voltage control unit 52.

The plural third electrodes 60 are provided on the transparent substrate 21 on the side of the liquid crystal layer 23. The plural first electrodes 30 are provided on the dielectric layer 25 on the side of the liquid crystal layer 23. The plural second electrodes 40 are provided on the transparent substrate 22 on the side of the liquid crystal layer 23. The first electrodes 30, second electrodes 40 and third electrodes 60 are formed of transparent electrodes. The dielectric layer 25 is formed of an insulating layer used for preventing the first electrodes 30 from being electrically connected to the third electrodes 60.

Figure 15:
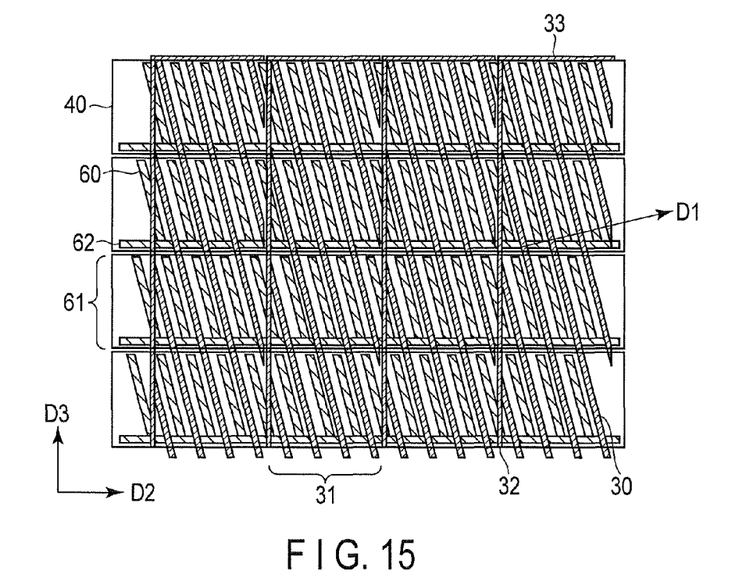
FIG. 15 is a plan view of first electrodes, second electrodes and third electrodes.

FIG. 15 is a plan view of the first electrodes 30, second electrodes 40 and third electrodes 60. The plane shape of the first electrodes 30 and second electrodes 40 is the same as in the fourth embodiment.

Like the first electrodes 30, the plural third electrodes 60 are arranged at regular intervals along first direction D1. The array pitch of the third electrodes 60 is the same as that of the first electrodes 30 and each third electrode 60 is arranged between the first electrodes 30. The width of the first electrode 30 is made smaller than the distance between the first electrodes 30. One columnar lens of the liquid crystal GRIN lens 20 is formed of adjacent two first electrodes 30. Therefore, adjacent two first electrodes 30 are arranged at both ends of the lens to form end electrodes and the third electrode 60 between the adjacent two first electrodes 30 is arranged at the center of the lens to form a central electrode.

The plural third electrodes 60 are divided into a plurality of third electrode regions 61 arranged along third direction D3. A preset number of third electrodes 60 contained in each third electrode region 61 are electrically connected via an extension line 62. The extension line 62 is formed of the same material as the third electrode. The extension line 62 extends in second direction D2 and is arranged at the end portion of the third electrode region 61 in third direction D3. The third electrode region 61 is arranged in correspondence to the second electrode 40 and the size of the third electrode region 61 is substantially the same as the size of the second electrode 40. Other configurations in this embodiment are the same as in the fourth embodiment.

Next, the operation of the liquid crystal GRIN lens 20 is explained. The third voltage control unit 52 is configured to be electrically connected to the plural extension lines 62 and independently voltage-control the plural extension lines 62, respectively.

The third voltage control unit 52 drives the extension lines 62 corresponding to a region in which the 3D display is performed. At this time, the third voltage control unit 52 applies the same voltage as the second electrode 40 to the third electrodes 60 via the extension line 62. The operations of the first voltage control unit 50 and second voltage control unit 51 are the same as in the fourth embodiment.

In this embodiment, the first electrodes 30 are positioned in lens end portions and the third electrode 60 is positioned in the lens central portion. A potential difference higher than or equal to threshold voltage Vth is applied to the liquid crystal region between the first electrode 30 and the second electrode 40 and a potential difference higher than or equal to threshold voltage Vth is not applied to the liquid crystal region between the third electrode 60 and the second electrode 40. Therefore, since liquid crystal molecules rise with respect to the substrate in the lens end portion, the index of refraction can be made small. Further, since the potential difference is set to substantially 0 V in the lens central portion, an unwanted electric field will not be applied to the liquid crystal region in the lens central portion. Therefore, an ideal electric field distribution in which the electric field gradually varies can be obtained between adjacent two first electrodes 30 and a more preferable refractive index distribution as a lens can be realized.

On the other hand, when the 2D display is performed, the first voltage control unit 50, second voltage control unit 51 and third voltage control unit 52 respectively apply reference voltages (for example, ground voltages) to the first electrodes 30, second electrodes 40 and third electrodes 60. In this case, since no electric field is applied to the liquid crystal layer 23, the liquid crystal molecules 24 maintain their initial alignment. Therefore, a refractive index distribution as a lens is not realized and the 2D display is performed.

As described above in detail, according to this embodiment, like the fourth embodiment, switching of the 2D display and 3D display can partially be realized in either the vertical or horizontal direction of the screen. Further, since the third electrode 30 for controlling the electric field distribution is added to the liquid crystal region between the first electrodes 30 functioning as one lens, a more ideal electric field distribution can be attained and a refractive index distribution that is more preferable as a lens can be realized. Other effects in this embodiment are the same as in the first embodiment.

Further, in this embodiment, a case wherein one type electrodes (third electrodes 60) is further added is explained, but this is not limited to this case. It is possible to more finely control the electric field distribution by using a larger number of electrodes.

Further, like the first embodiment, the second electrode 40 may be formed in a plane form on the transparent substrate 22. In this case, it is not necessary to divide the plural third electrodes 60 into a plurality of regions and the plural third electrodes 60 may be put together and electrically connected to one extension line 62.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal optical element comprising:
    a first substrate having first and second regions which are arranged to sandwich a boundary line;
    a second substrate arranged in opposition to the first substrate;
    a liquid crystal layer provided between the first and second substrates;
    first electrodes provided in each of the first and second regions, the first electrodes extending in a first direction intersecting with the boundary line, the first electrodes being arranged in a second direction intersecting with the first direction;
    a first extension line electrically connected to the first electrodes and extending along the boundary line; and
    second electrodes provided on the second substrate and arranged in opposition to the first and second regions,
    wherein the first and second regions are arranged in a third direction, the third direction intersecting with the boundary line, and
    the first direction intersects with the third direction and the boundary line.

2. The element of claim 1, wherein the third direction is perpendicular to the boundary line.

3. The element of claim 1, wherein a width of the first electrodes is larger than half the array pitch of the first electrodes.

4. A liquid crystal optical element comprising:
    a first substrate having first and second regions which are arranged to sandwich a boundary line;
    a second substrate arranged in opposition to the first substrate;
    a dielectric layer provided on the first substrate;
    a liquid crystal layer provided between the dielectric layer and the second substrate;
    first electrodes provided on the dielectric layer and in each of the first and second regions, the first electrodes extending in a first direction intersecting with the boundary line, the first electrodes being arranged in a second direction intersecting with the first direction;
    a first extension line electrically connected to the first electrodes and extending along the boundary line;
    second electrodes provided on the second substrate and arranged in opposition to the first and second regions; and
    third electrodes provided on the first substrate and extending in the first direction, the third electrodes being arranged in the second direction, the third electrodes being provided between the first electrodes, wherein the first and second regions are arranged in a third direction, the third direction intersecting with the boundary line, and the first direction intersects with the third direction and the boundary line.

5. The element of claim 4, wherein the third electrodes are divided into third regions arranged corresponding to the second electrodes, and the third electrodes included in each of the third regions are electrically connected to a third extension line.

6. An image display device comprising the liquid crystal optical element of claim 1 and an image display unit that emits light to the liquid crystal optical element.

7. The element of claim 1, further comprising a second extension line electrically connected to the first electrodes and the first extension line, and extending in the third direction.

8. The element of claim 1, wherein the first and second regions are alternately arranged.

9. The element of claim 1, further comprising a driver configured to apply a first voltage to the first electrodes and a second voltage to the second electrodes, wherein the first voltage is larger than a sum of the second voltage and a threshold voltage of the liquid crystal layer.

10. The element of claim 4, further comprising a second extension line electrically connected to the first electrodes and the first extension line, and extending in the third direction.

11. The element of claim 4, wherein the first and second regions are alternately arranged.

12. The element of claim 4, further comprising a driver configured to apply a first voltage to the first electrodes and to apply a second voltage to the second and third electrodes, wherein the first voltage is larger than a sum of the second voltage and a threshold voltage of the liquid crystal layer.

* * * * *